United States Patent
Gargi

(10) Patent No.: US 7,278,117 B2
(45) Date of Patent: Oct. 2, 2007

(54) IMAGE SEGMENTATION AND WARPING FOR SPECIALIZED DISPLAY VIEWING

(75) Inventor: Ullas Gargi, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 777 days.

(21) Appl. No.: 10/186,694

(22) Filed: Jul. 2, 2002

(65) Prior Publication Data

US 2004/0004641 A1    Jan. 8, 2004

(51) Int. Cl.
*G06F 3/14* (2006.01)
*G06F 3/147* (2006.01)

(52) U.S. Cl. ............... 715/864; 382/306; 345/667
(58) Field of Classification Search ............ 382/176, 382/282, 306; 709/230; 715/864; 345/667
See application file for complete search history.

(56) References Cited

U.S. PATENT DOCUMENTS

| | | | | |
|---|---|---|---|---|
| 4,484,349 A * | 11/1984 | McCubbrey | ............ | 382/308 |
| 4,750,209 A * | 6/1988 | Shimura et al. | ............ | 382/176 |
| 5,073,953 A * | 12/1991 | Westdijk | ............ | 382/176 |
| 5,125,045 A * | 6/1992 | Murakami et al. | ............ | 382/270 |
| 5,159,667 A * | 10/1992 | Borrey et al. | ............ | 715/500 |
| 5,384,904 A * | 1/1995 | Sprague et al. | ............ | 345/668 |
| 5,453,788 A * | 9/1995 | Matsushima et al. | .... | 348/395.1 |
| 5,465,304 A * | 11/1995 | Cullen et al. | ............ | 382/176 |
| 5,479,602 A * | 12/1995 | Baecker et al. | ............ | 715/838 |
| 5,557,728 A * | 9/1996 | Garrett et al. | ............ | 715/801 |
| 5,613,017 A * | 3/1997 | Rao et al. | ............ | 382/174 |
| 5,617,485 A * | 4/1997 | Ohuchi et al. | ............ | 382/176 |
| 5,644,406 A * | 7/1997 | Harrington et al. | ............ | 382/239 |
| 5,761,686 A * | 6/1998 | Bloomberg | ............ | 715/529 |
| 5,764,238 A * | 6/1998 | Lum et al. | ............ | 345/660 |
| 5,793,379 A * | 8/1998 | Lapidous | ............ | 345/606 |
| 5,796,401 A * | 8/1998 | Winer | ............ | 345/619 |
| 5,850,490 A * | 12/1998 | Johnson | ............ | 382/306 |
| 5,860,073 A * | 1/1999 | Ferrel et al. | ............ | 715/522 |
| 5,883,973 A * | 3/1999 | Pascovici et al. | ............ | 382/176 |
| 6,023,714 A * | 2/2000 | Hill et al. | ............ | 715/513 |
| 6,108,675 A * | 8/2000 | Gregg et al. | ............ | 715/519 |
| 6,125,201 A * | 9/2000 | Zador | ............ | 382/166 |
| 6,157,389 A * | 12/2000 | Knowlton | ............ | 345/660 |
| 6,160,907 A * | 12/2000 | Robotham et al. | ............ | 382/154 |
| 6,163,626 A * | 12/2000 | Andrew | ............ | 382/240 |
| 6,195,459 B1 * | 2/2001 | Zhu | ............ | 382/176 |
| 6,205,499 B1 * | 3/2001 | Houlberg et al. | ............ | 710/68 |
| 6,300,947 B1 * | 10/2001 | Kanevsky | ............ | 715/866 |
| 6,311,180 B1 * | 10/2001 | Fogarty | ............ | 707/4 |
| 6,317,781 B1 * | 11/2001 | De Boor et al. | ............ | 709/217 |
| 6,345,279 B1 * | 2/2002 | Li et al. | ............ | 707/104.1 |
| 6,351,568 B1 * | 2/2002 | Andrew | ............ | 382/239 |

(Continued)

OTHER PUBLICATIONS

Bjork Staffan et al. "West A browser for small terminals" 2000.*

(Continued)

*Primary Examiner*—Weilun Lo
*Assistant Examiner*—Steven Theriault

(57) ABSTRACT

A method, program product and system for warping image data, the method comprising in one embodiment: receiving image data for an image; segmentation of the image into a plurality of regions based on regional classification of the image; obtaining a set of warping rules; and warping the image based on the classification of each region and the warping rules.

50 Claims, 5 Drawing Sheets

U.S. PATENT DOCUMENTS

| | | | |
|---|---|---|---|
| 6,445,828 B1 * | 9/2002 | Yim | 382/250 |
| 6,466,696 B1 * | 10/2002 | Politis | 382/226 |
| 6,490,675 B1 * | 12/2002 | Sugiura | 712/225 |
| 6,542,635 B1 * | 4/2003 | Hu et al. | 382/173 |
| 6,542,641 B1 * | 4/2003 | Andrew et al. | 382/233 |
| 6,556,217 B1 * | 4/2003 | Makipaa et al. | 345/667 |
| 6,562,077 B2 * | 5/2003 | Bobrow et al. | 715/517 |
| 6,597,811 B1 * | 7/2003 | Batkilim et al. | 382/232 |
| 6,606,416 B1 * | 8/2003 | Yip et al. | 382/240 |
| 6,640,010 B2 * | 10/2003 | Seeger et al. | 382/229 |
| 6,650,775 B1 * | 11/2003 | Harrington | 382/173 |
| 6,654,814 B1 * | 11/2003 | Britton et al. | 709/246 |
| 6,665,841 B1 * | 12/2003 | Mahoney et al. | 715/520 |
| 6,686,955 B1 * | 2/2004 | Fields et al. | 348/218.1 |
| 6,778,709 B1 * | 8/2004 | Taubman | 382/240 |
| 6,779,042 B1 * | 8/2004 | Kloba et al. | 709/248 |
| 6,801,224 B1 * | 10/2004 | Lewallen | 715/746 |
| 6,822,663 B2 * | 11/2004 | Wang et al. | 715/854 |
| 6,825,857 B2 * | 11/2004 | Harasimiuk | 345/660 |
| 6,832,353 B2 * | 12/2004 | Itavaara et al. | 715/744 |
| 6,853,318 B1 * | 2/2005 | Rabbani et al. | 341/50 |
| 6,857,102 B1 * | 2/2005 | Bickmore et al. | 715/501.1 |
| 6,873,734 B1 * | 3/2005 | Zandi et al. | 382/233 |
| 6,882,755 B2 * | 4/2005 | Silverstein et al. | 382/282 |
| 6,898,325 B2 * | 5/2005 | Gormish | 382/248 |
| 6,941,382 B1 * | 9/2005 | Tuli | 709/247 |
| 6,947,874 B2 * | 9/2005 | Chen | 702/189 |
| 6,982,729 B1 * | 1/2006 | Lange et al. | 345/660 |
| 2001/0047394 A1 * | 11/2001 | Kloba et al. | 709/217 |
| 2002/0016818 A1 * | 2/2002 | Kirani et al. | 709/203 |
| 2002/0116534 A1 * | 8/2002 | Teeple | 709/246 |
| 2002/0143659 A1 * | 10/2002 | Keezer et al. | 705/27 |
| 2002/0191031 A1 * | 12/2002 | Ricard | 345/838 |
| 2003/0009567 A1 * | 1/2003 | Farouk | 709/229 |
| 2005/0229111 A1 * | 10/2005 | Makela | 715/802 |
| 2005/0229118 A1 * | 10/2005 | Chiu et al. | 715/864 |
| 2005/0273706 A1 * | 12/2005 | Manber et al. | 715/513 |

OTHER PUBLICATIONS

U.S. Appl. No. 09/843,755, filed Apr. 30, 2001, Silverstein, Class 715, Subclass 864.

U.S. Appl. No. 10/039,994, filed Oct. 19, 2001, Silverstein, Class 382, Subclass 282.

Adobe, Reflow the Contents of Adobe PDF Documents: Tutorial, Adobe Systems Incorporated, 2002, 7 Sheets.

* cited by examiner

IMAGE SEGMENTATION AND WARPING FOR SPECIALIZED DISPLAY VIEWING

BACKGROUND OF THE INVENTION

Field of the Invention

The present invention relates generally to processing of data for display, and more particularly, to processing data for specialized display.

Traditional computer desktops use large pixel areas for display. To use a PDA to view the same content, for example a web page, there are generally two options. The first option is simply to serve different content. For example, a WAP (wireless application protocol) might be used to generate content at the server side, suitable for display on a specialized display device such as a small mobile screen. A second option is to modify the content graphically so as to fit on the device. This content modification can happen either at the client or the server side. Ideally, such content modification takes place on the client so that the content server, e.g., the web server does not need to be client-aware. Client-side processing also allows the use of the technique for applications other than web browsing, e.g., remote desktop viewing.

One approach in the prior art is disclosed by Adobe at http://www.adobe.com/epaper/tips/acr5reflow/main.html. In this approach text remains at a fixed size, but is reflowed differently on a smaller screen and images are resized to fit the smaller screen. The technique requires that the author of the PDF document insert tags into the document that allow the reflow of the text. The method also assumes that the document is local and not remote.

SUMMARY OF THE INVENTION

The present invention includes a method of segmenting a fullsize 2-D or 3-D display. The method comprises: obtaining image data for an image; segmentation of the image into a plurality of regions based on regional image classification; and transmitting the image to a client with the classification of regions designated.

In a further embodiment of the present invention, a method is provided for displaying a segmented image, comprising: receiving image data for an image with classification of regions; obtaining rules for warping; warping the image based on the classification of each region and the rules for warping; and displaying the warped image.

In a further embodiment of the present invention, a method is provided for warping image data comprising: receiving image data for an image; segmentation of the image into a plurality of regions based on regional classification; obtaining a set of warping rules; and warping the image based on the classification of each region and the warping rules.

In a further embodiment of the present invention, a program product is provided for segmenting an image for viewing, comprising machine readable program code for causing a machine to perform the following method: obtaining image data for an image; segmentation of the image into a plurality of regions based on regional classification; and transmitting the image data to a client with the classification of regions designated.

In a further embodiment of the present invention, a program product is provided for displaying a segmented image, comprising machine readable program code for causing a machine to perform the following method: receiving image data for an image with classification of regions of the image; obtaining rules for warping; warping the image based on the classification of each region and the rules for warping; and displaying the warped image.

In a further embodiment of the present invention, a program product is provided for warping image data comprising machine readable program code for causing a machine to perform the following method: receiving image data for an image; segmentation of the image into a plurality of regions based on regional classification; obtaining a set of warping rules; and warping the image based on the classification of each region and the warping rules.

In a further embodiment of the present invention, a system is provided for segmenting an image for viewing, comprising: a component for obtaining image data for an image; a component for segmentation of the image into a plurality of regions based on regional classification; and a component for transmitting the image data to a client with the classification of regions designated.

In a further embodiment of the present invention, a system is provided for displaying a segmented image, comprising: a component for receiving image data for an image with classification of images; a component for obtaining rules for warping; a component for warping the image based on the classification of each region and the rules for warping; and a component for displaying the warped image.

In a further embodiment of the present invention, a system is provided for warping image data comprising: a component for receiving image data for an image; a component for segmentation of the image into a plurality of regions based on regional classification; a component for obtaining a set of warping rules; and a component for warping the image based on the classification of each region and the warping rules.

DETAILED DESCRIPTION OF THE EMBODIMENTS

The present invention is directed to processing image data such as a screen shot from a desktop, a document, a web page, or a 3-D environment to allow warped portions of the image data to be displayed on a specialized and typically smaller viewing area, such as a PDA or cell phone, with minimal scrolling by the user. The warping process in an embodiment leads to a more intuitive interface for the user. U.S. application Ser. Nos. 09/843,755 and 10/039994 are hereby incorporated into the specification in their entirety.

Figure 1:
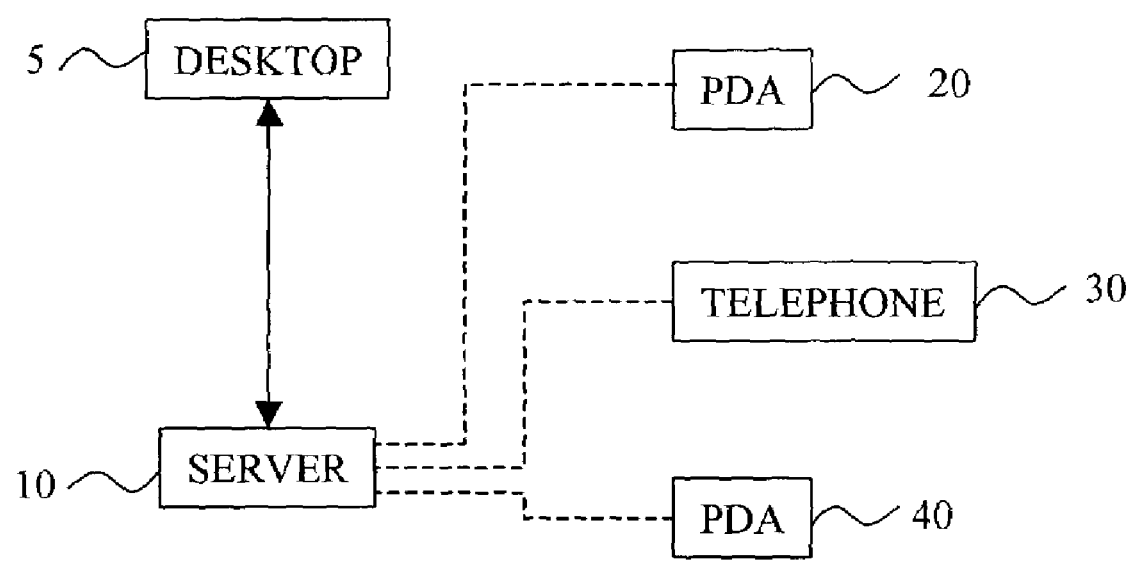
FIG. 1 is a schematic block diagram of an environment for the present invention.

Referring to FIG. 1, there is shown representationally image data 5 for a full-size screen or document or window or web page or 3-D environment, either generated at the location of a desktop or by a server 10 or another comparable device. It is desired to appropriately render the image from a desktop or server on a specialized viewing area such as a smaller viewing area like a PDA 20, or a telephone or cell phone 30, or another PDA 40. In accordance with the present invention, it is desired to warp the full-sized image in a content specific manner to lead to a more intuitive interface for the user.

Figure 2:
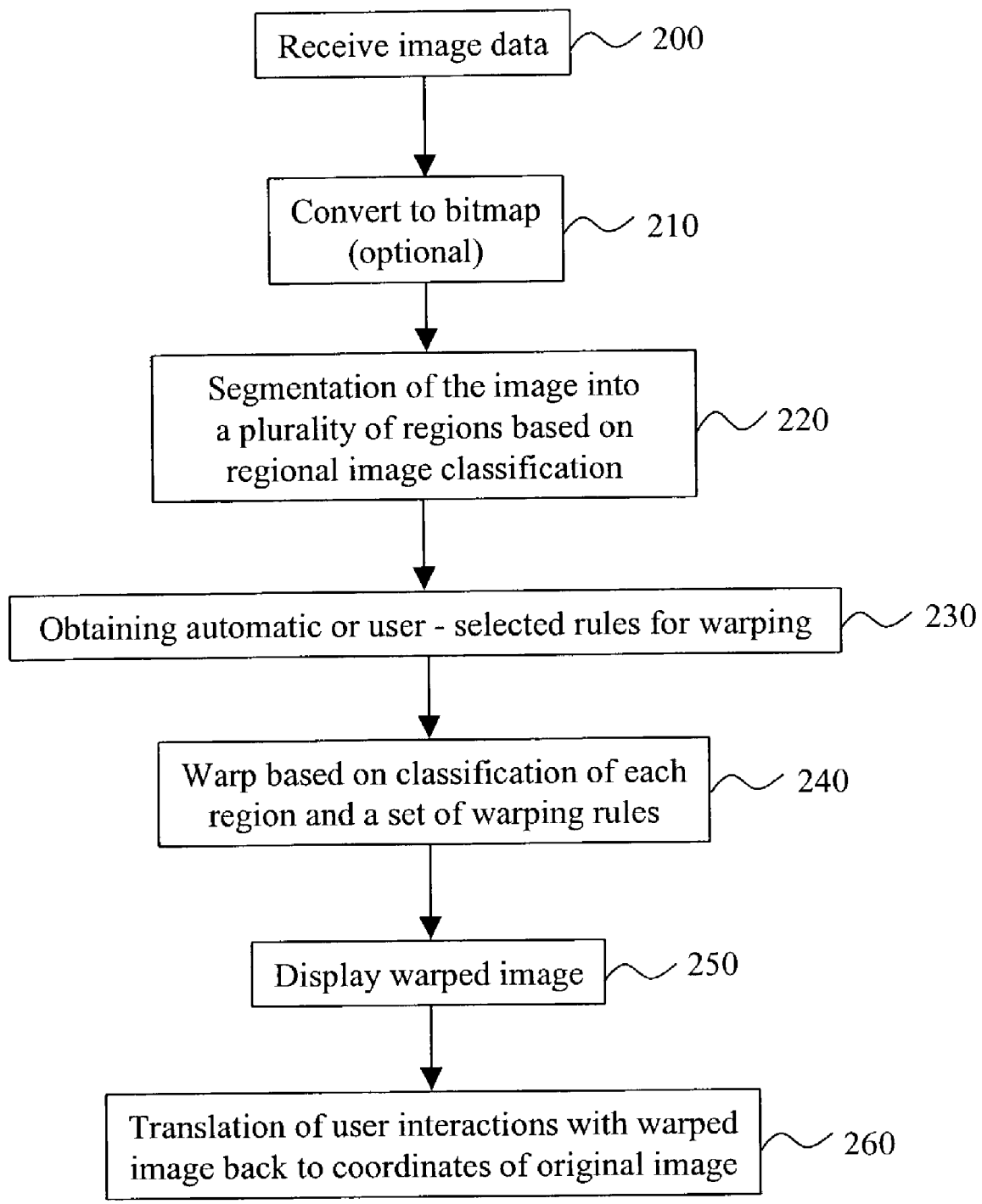
FIG. 2 is a flowchart block diagram of an embodiment of a client-side method and program product in accordance with the present invention.

Referring now to FIG. 2, there is shown an embodiment of an implementation of the present invention on a client-side. Image data is received in block 200. The image data may be from a server, or may come from a desktop. Typically the client will receive the data to be displayed in some kind of visual or page description language such as HTML, PDF, or as a 3-D model description in a language such as VRML, or as a raw bitmap as the lowest common denominator format, or if the client is viewing a remote desktop. If the client receives a PDF page or other data format, then in block 210 the page may be converted into a bitmap, if that is the desired processing.

Note that PDF may be directly analyzed, segmented into regions based on PDF codes, and warped on a device that renders PDF natively (such as a printer for example). However, raw bitmap data is generally a lowest common denominator since any format can be converted into that format (because most formats ultimately are converted to a bitmap, to be viewed on a screen). Alternatively, in a 3-D display example, the 3-D model description could be directly analyzed into 3-D regions composed of texture mapped objects, anti-aliased objects, active objects, or other objects (not mutually exclusive region types).

segmentation techniques include application Ser. No. 09/545,323, titled "Method and Apparatus for Analyzing an Image for Controlling a Scanner", by Jian Fan, Charles Jia, and Anne-Marie Woodson filed on Apr. 7, 2000; a continuation-in-part of application Ser. No. 09/545,323 having a Serial No. of Ser. No. 09/709,685, titled "Methods and Apparatus for Analyzing an Image", filed by Jian Fan on Nov. 9, 2000; "Hough-Based Model for Recognizing Bar Charts in Document Images" by Yan Ping Zhou, Chew Lim Tan, in the journal proceeding of the SPIE—the International Society for Optical Engineering, Vol. 4307; "An Approach for Automatic Recognition of Graphics" by R. Kasturi, C. Shih, and L. A. Fletcher, ISBN 0 8106 0742 4, published by IEEE Computer Society Press, 1986; "A Robust Algorithm for Text String Separation from Mixed Text/Graphics Images" by L. A. Fletcher, R. Kasturi, Journal of the IEEE Transactions on Pattern Analysis and Machine Intelligence, Vol.10, No. 6, 1988; "Page Segmentation and Content Classification for Automatic Document Image Processing", by S. K. Yip and Z. Chi, ISBN 962 85766 2 3, Proceedings of the 2001 International Symposium on Intelligent Multimedia, Video and Speech Processing, ISIMP 2001, pp. 279-82; "Classification of Document Pages Using Structure-Based Features", by C. Shin, D. Doermann, and A. Rosenfeld, International Journal on Document Analysis and Recognition, Vol. 3, No. 4, Springer-Verlag, May 2001.

The result of the image segmentation step is to classify each region of the image into one of a number of types of data and to index it in a hierarchical structure. An example of such a hierarchical structure for a web page is shown below.

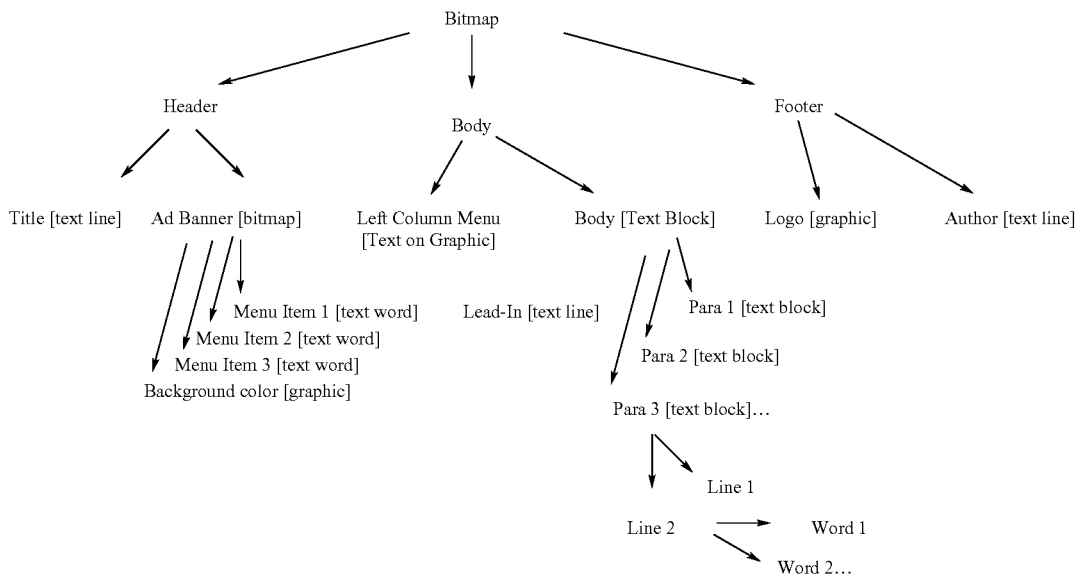

Referring to block 220, the fullsize image is segmented into a plurality of regions based on regional image classification. This segmentation operation may utilize a variety of different methods and algorithms to accomplish the segmentation. By way of example but not by way of limitation, paper document image analysis for breaking a bitmap into regions in a hierarchical structure may be used. By way of example, but not by way of limitation, such bitmap image Note that each region will have a bounding box describing its spatial extent. This operation is inherent in the operation of the segmentation of regions. Each bounding box will have its own coordinates to determine its spatial location within the fullsize image or web page. It can be seen from the web page displayed above in diagram form that the segmentation step breaks up the fullsize image hierarchically and classifies each region as either a bitmap (image), graphics (line drawing or constant cover), text block, text lines, text words, text on background, and various other classifications now known or to be developed. Note that the descriptive name given to elements such as Title, Ad Banner, etc., will not and need not be generated by the module. The text names are provided in the diagram only for purposes of explanation. In a typical implementation of the present invention, regions would be named textline 1, textline 2, bitmap 1, bitmap 2, etc.

A review of the foregoing web page illustrates the hierarchy of the data structure. The highest level is the Bitmap which then flows down to the Header, Body, and Footer. These elements may be classified as either text or bitmap. For example, a Header can be either text or a bitmap. A Body is likely to be text, but not necessarily. Similarly a Footer could be a company logo. Under the Header hierarchy are the Title[textline] and Ad Banner[bitmap] items. Under the Ad Banner[bitmap] item, are four (4) items, namely Menu Item 1[text word], Menu Item 2[text word], Menu Item 3[text word], and Background Color[graphic]. Likewise, under the Body hierarchy is a Left Column Menu[text on graphic] and a Body[text block]. Under the Body item are Para 1[text block], Para 2[text block], and Para 3[text block]. Each one of the Paras would then be broken down hierarchically by Line 1, Line 2, or in some other convenient manner. Each Line would then be broken down by Word 1, Word 2, or in some other convenient manner.

Thus, it can be seen that the fullsize image or web page will be broken down and classified by region as a bitmap, like a photo, a graphic such as a logo or cartoon, text, which is then broke down by text blocks, lines and words, a mixture of text and graphics, and various other classifications).

Bounding boxes are determined so that there is only one bounding box per classified element. That means that some bounding boxes can be much larger than other bounding boxes and can be irregular depending upon the size of the element. Bounding boxes will be nested, because the elements are themselves nested (textline1 contains word1, word2, etc.), but each element will have a single distinct bounding box. Since element sizes vary, from large bitmaps to single words, the bounding box sizes will also vary.

Referring now to block 230, the resulting segmentation of the fullsize image data into a plurality of regions determined by classification of the data in each region is then used for determining, in part, the method of warping for that region. The warping is based on a classification of a region and on a set of warping rules. The rules determine how to warp each region based on the classification of the region and potentially on other parameters such as the size of the region and the location of the region. For example in accordance with one rule, bitmaps for photographs and other bitmap-only items, can be scaled down to a small fraction of the original size of the bitmap using an image-specific scaling algorithm (or may be deleted entirely if desired). A rule for graphics may be to scale down the graphic by some predetermined percentage or by some other means. A rule for text blocks may be to split up the text blocks into lines, and the lines broken up at word boundaries if the lines are too large to fit in a single line of the client's display. In essence, text blocks can be re-arranged to fit, while communicating line and paragraph boundaries by increased amounts of white image or a special symbol in the output, e.g., by communicating the beginning of a new paragraph by the symbol [para] and then maintaining the words consecutively. These and other similar methods can be used to compact text while retaining the flow characteristics of the text. Additionally, text-specific re-scaling algorithms may be used.

Figure 4:
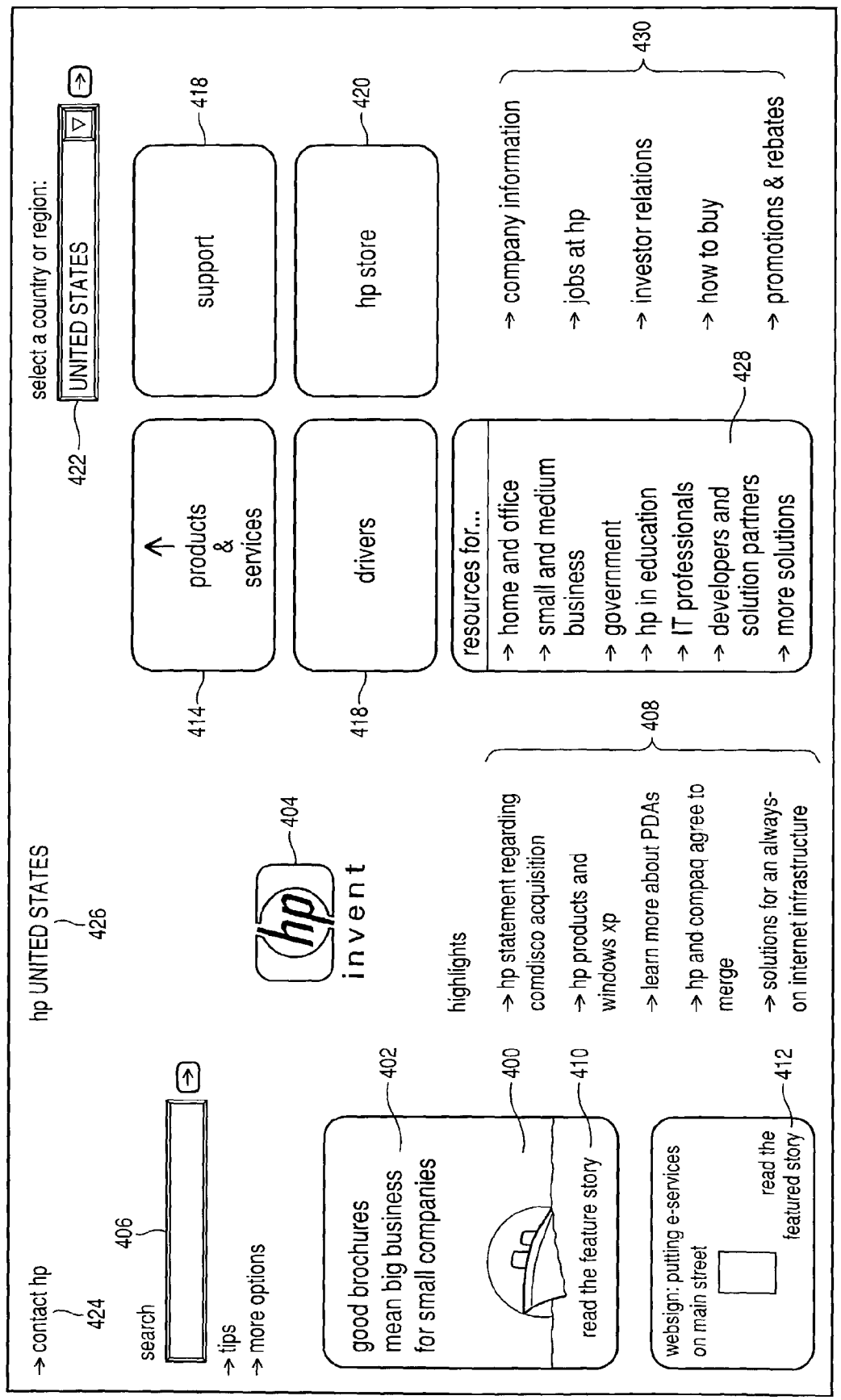
FIG. 4 is a diagram of a desktop screen shot before warping.
Figure 5:
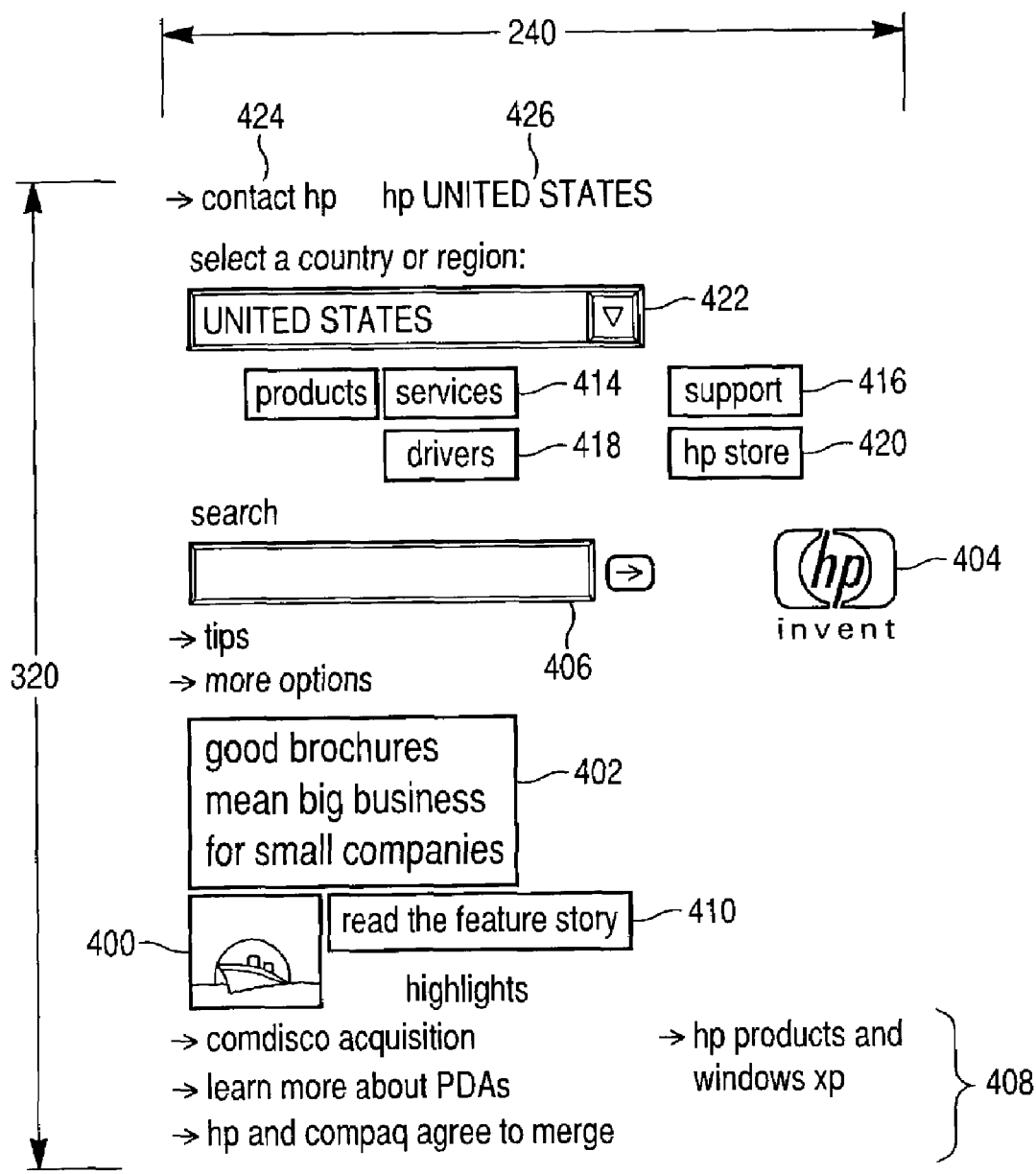
FIG. 5 is a diagram of the screen shot after warping of various regions of the image in accordance with the present invention.

An example of the use of segmentation and warping in accordance with a set of rules is illustrated by comparing an original screen web page shown in FIG. 4 to a warped version of the same web page shown in FIG. 5. FIG. 5 has been warped to fit on a 240×320 display. Numeric designations have been given to each of the different classified items in FIG. 4 and a corresponding numeral is shown in FIG. 5 in a warped version, with the exception of items 412, 428, and 430, which must be scrolled in order to be viewed.

Referring in more detail to this warping operation, the graphic of the ship 400 is shown in a significantly scaled down version in FIG. 5. The text-on-graphics region 402, is shown in FIG. 5 in the same scale or in a slightly scaled down version thereof. The HP logo 404 is classified as a graphic and is shown after re-scaling in FIG. 5. The search box 406 with the "tips" and "more options" arrows, are shown in a different position and slightly scaled down in FIG. 5. The text box 408 is shown slightly scaled down and re-arranged in order to fit into a different spatial location in FIG. 5. The text-on-graphic "read the feature story" 410 is shown at the same or a slightly different scale in FIG. 5. As noted above, the text-on-graphic "websign: putting E-services on main street" and the other items in that graphic 412 are not shown on FIG. 5 and must be reached by means of scrolling. The text on graphic blocks 414, 416, 418, and 420 are shown in scaled down versions and re-positioned in FIG. 5. The text in graphic 422 "select a country or region:" and the search box are shown repositioned and at the same scale or slightly scaled down in FIG. 5. The text and arrow 424 "contact HP" and the text 426 "hp UNITED STATES" are shown in scaled down versions and re-positioned in FIG. 5. The text-on-graphic 428 and the text 430 are, in accordance with the rules for this particular implementation, not shown in FIG. 5 and may be reached by means of scrolling.

The foregoing example shown in FIG. 4 and FIG. 5 is based on a specific set of rules designed to extract the most important aspects of a particular fullsize image or web page and to display those aspects in a reduced size or specialized display. The rules generally will re-scale and reposition those items to be displayed on the new specialized or smaller scale display based on the priorities of the person setting the rules. For example, in the warping of FIG. 4 to FIG. 5, the person setting the rules prioritized certain selected items by means of the scaling chosen and the positioning of the re-scaled version on the specialized screen and by the choice of whether or not to completely delete or make available only for viewing by means of scrolling. For example, it can be seen that one of the rules followed was that for graphics only classifications, such graphics were significantly re-scaled downward. Alternatively, for text on graphics such as the search boxes 406, 422 and the wording 402, the text was not re-scaled or was rescaled only slightly. However, the graphics (background) surrounding the text on graphics was significantly reduced or deleted.

It should be noted that there is no restriction on where the rules for warping should be set. For example, they may be set at the server or a proxy server, or at the client, or at another convenient location. Additionally, different rules may apply depending on whether the fullsize display is a web page or a word document, or graphics heavy web page versus a mostly text page, or various other permutations. Profiles defined by the user may declare particular content, e.g., a photo album, for example to be treated differently depending on the user's priority. Such profiles may be accessed at sign-in, or at any other convenient time.

FIG. 2 has implied an implementation of the present invention on the client side. Alternatively, the present invention processing may be performed in part or in whole at the server, or a proxy server, or at another convenient location, or may be split among a variety of locations and devices, including the client.

Figure 3:
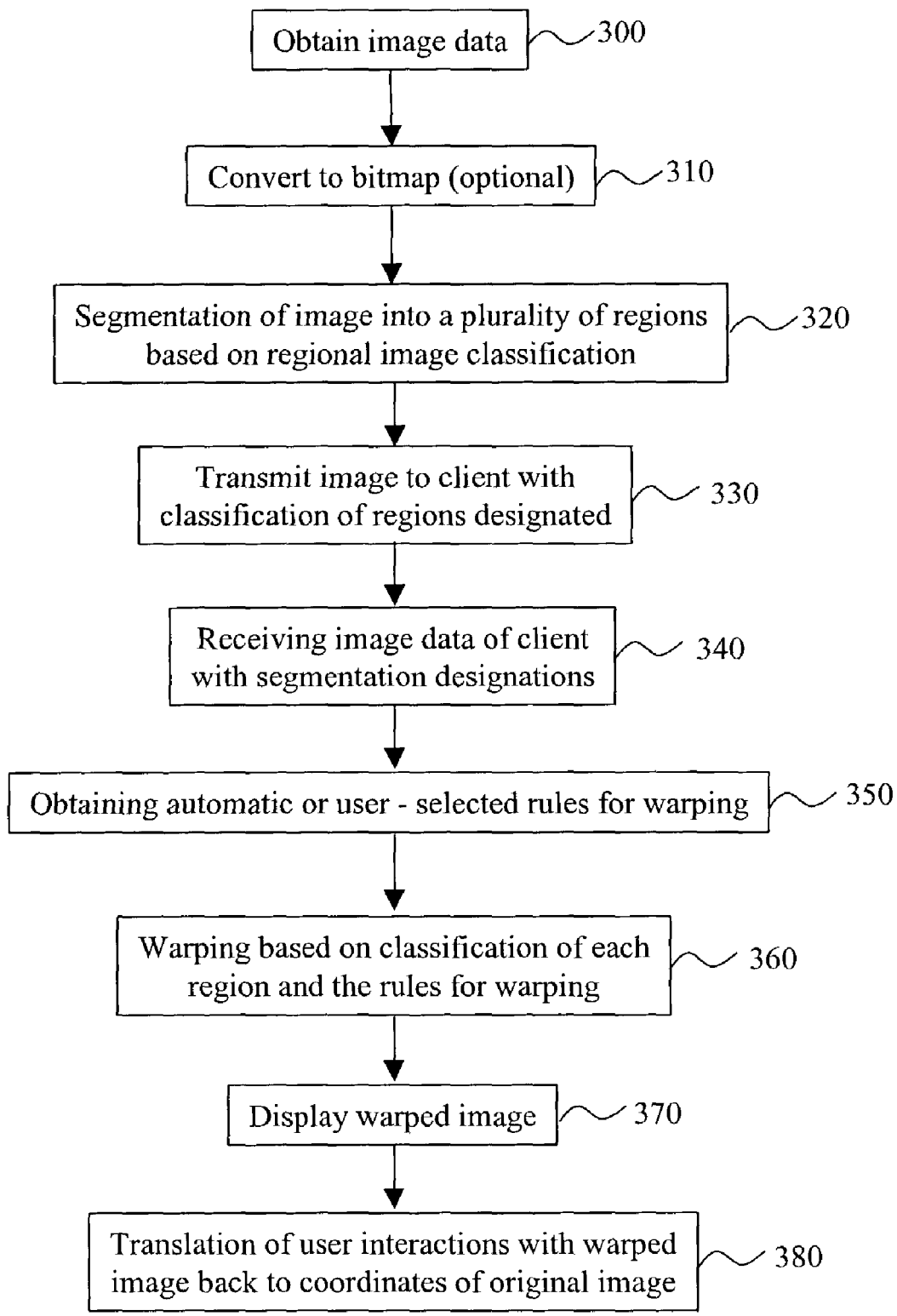
FIG. 3 is a block diagram flowchart of an embodiment of a method and program product in accordance with the present invention wherein parts of the method are performed at a server or proxy server and parts of the method are performed at the client.

Referring to FIG. 3, there is shown an example implementation of the present invention using the combination of a server and a client to perform the processing of the present invention. Referring to FIG. 3, in block 300 the fullsize image data is obtained. If the image data is not in bitmap form, then it may optionally be converted to bitmap form in block 310 to ease processing if required by the segmentation stage.

Referring to block 320, segmentation of the fullsize image into a plurality of regions based on regional classification is performed in a similar fashion to block 220 of FIG. 2. Note that the segmentation operation is likely to require the most computing power in the present invention, and may be most advantageously placed away from the client.

Referring to block 330, the image is then transmitted to one or more clients with the classification of regions designated. This designation of the classifications may comprise any rational format. For example, a list of region extents (e.g., polygonally bounded regions) and their classification labels is shown below. Example:
Poly 0, 0, 230, 80, 455, 129, 300, 190, 0, 200 GRMXTEXT
Rect 0, 200 800, 200, 800, 750, 0, 750 TEXT
Etc.

The foregoing indicates that the polygonally bounded region with five sides as specified is a Graphic with a Mixed Text region; and that the rectangle with the specified co-ordinates is a Text block. Note that the spatial extent encoding can be more flexible than the polygon vertex lists above, e.g., a chain code could be used to be able to specify arbitrary closed regions, for example.

Given this list, the client matches each label with its currently applicable rule set and decides what warping to perform with the region.

Accordingly, it can be seen in one example that at the server or a server proxy the segmentation has been performed based on regional classification, but no actual warping is performed. However, in a different implementation of the present invention, warping could take place at the server. This would be the case if there were known to be a large number of clients with the same display specifications and user profiles for the document in question. For example, a cell phone service provider might define a default profile for breaking news content from CNN for their phone models.

Note also that one advantage of performing the classification and segmentation on the server or proxy server, is that the computation is done only once but used by potentially many clients, instead of being performed many times on many clients. Each client may be have a different set of rules and profiles, but still operate on the same fullsize image and segmentation designations.

Referring to block 340, the fullsize image data is received at the client with the segmentation designations.

In an alternative implementation, the fullsize image is reduced in resolution (but not in layout) and then sent to the client. In yet another implementation, a client may store its default preferences at the server and some filtering of content (but not complete warping) may occur at the server or proxy server before the content is sent to the client. For example, a user may choose to NEVER (irrespective of any other rules) receive any bitmaps. In this case, the fullsize display may be cropped appropriately to remove bitmaps and the remaining image and segmentation designations sent to the client. This approach would be important in low bandwidth situations for example, or any situation where a particular region type is undesirable. As yet another example, a client that cannot render 3-D models of greater than some complexity may request that they be dropped, or converted to lower complexity by the server, before being sent to the client.

In block 350, rules for warping are obtained either automatically or by means of user selection. As noted previously, the rules may be obtained from the server, or may be set automatically on the client side device based on the characteristics of the client side device or may be determined by the bandwidth available, or may be set manually or automatically by the user at the client side, or may be set by a user profile, which becomes active when the user logs into the system.

Referring to block 360, warping of the fullsize image based on the classification of each region and rules for warping are then performed, as described earlier for FIG. 2.

Finally, the warped image is displayed in block 370 at the specialized or reduced size client.

Accordingly, it can be seen that the image segmentation and warping modules may be implemented by software or hardware and may lie either on the server side (where the word "server" can refer to any remote image content generating computer, such as a website or remote desktop PC), between the server and the client at a proxy server, on the client itself, or at another convenient location. The implementation may differ depending upon the location of the client and the bandwidth available.

It should be noted that because the image that the user sees at the client is warped, any user interaction with that image will need to be translated back to the image before submission to any application that generated the image content. For example, clicking on an image element in the warped image will cause the coordinates of the click to be translated back to the original coordinates of that element in the original unwarped image before passing it back to the application. This translation may be performed either at the client or at the server or at a proxy server. In order to facilitate this translation back process, the correlation between the classified region in the image and the warped region in the new image must be retained. This operation of translation back is represented by block 380 in FIG. 3 and block 260 in FIG. 2.

It should be noted that the performance of the present invention may be improved by caching frequently accessed bitmap warping classifications on the proxy server. Thus, if one million PDA wireless users all access the front page of CNN.com, the image segmentation step will need to be performed only once and the classifications for warping stored on the proxy server so that they can be used by all subsequent visitors, until the front page content/layout changes.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various applications as are suited to the particular use contemplated. It is intended that the scope of the invention be defined by the claims appended hereto, and their equivalents.

What is claimed is:

1. A method for modifying an image by a server, comprising:
   obtaining image data for the image;
   determining whether the image is a graphics heavy image or a text heavy image;
   obtaining first set of warping rules in response to determining that the image is a graphics heavy image;
   obtaining a second set of warping rules in response to determining that the image is a test heavy image;
   segmenting the image into a plurality of regions based on regional classification of the image, the segmentation performed in response to a request by a client;
   classifying each region of the image into a data type of a plurality of data types, wherein each data type has a corresponding warping rule within the obtained first or second set of warping rules, and wherein multiple elements in a region are operable to be classified under a single data type;
   warping each region of the segmented image using the corresponding warping rule for the data type of that region; and
   transmitting the warped image data to the client, wherein the warped image data represents a modified version of the image.

2. The method as defined in claim 1, further comprising: receiving a user interaction with a warped image; and translating the interaction to the image.

3. The method as defined in claim 2, further comprising passing the interaction back to an originating application that originated the image.

4. The method as defined in claim 1, wherein the plurality of regions are indexed in a hierarchical data structure.

5. The method as defined in claim 4, wherein the classifications include at least two of a bitmap, graphic, text word, and text line.

6. The method as defined in claim 1, wherein the segmentation step includes the step of correlating each region to a set of coordinates.

7. The method as defined in claim 1, further comprising obtaining at least one warping rule prior to warping the segmented image.

8. A method for displaying a warped image, comprising:
   receiving image data far an image with classification of regions, wherein each region has been classified into a data type of a plurality of data types, wherein multiple elements in a region are operable to be classified under a single data type;
   obtaining rules for warping the image so the image can be displayed on a display with different display characteristics, wherein each data type has a corresponding rule for warping, and the obtained rules are the corresponding rules for warping for the data types that the regions are classified in;
   warping the image based on classification of each region and the corresponding rules for warping for the data types that the regions are classified in, wherein warping the image includes applying a scaling algorithm to the image to obtain at least one scaled region within the image and moving the at least one scaled region to a predetermined location in the warped image; and
   displaying the warped image.

9. The method as defined in claim 8, further comprising: receiving a user interaction with the warped image; and translating the interaction to the image.

10. The method as defined in claim 9, further comprising passing the interaction in the image back to an originating application that originated the image data.

11. The method as defined in claim 8, wherein a warping rule obtained in said obtaining rules for warping step comprises splitting at least one region classified as a text block into a plurality of lines, and splitting text lines into a plurality of words.

12. The method as defined in claim 11, wherein the words are scaled and rearranged within the warped image, but maintaining adjacent words consecutive.

13. The method as defined in claim 10, wherein the obtaining rules for warping step comprises obtaining a different set of rules based on whether the image is a web page or a text document.

14. The method as defined in claim 10, wherein the obtaining rules for warping step comprises obtaining a different set of rules based on whether the image is a graphics heavy web page or a text heavy web page.

15. The method as defined in claim 10, wherein the obtaining rules for warping step comprises obtaining a set of rules via selection by a user.

16. The method as defined in claim 10, wherein the obtaining rules for warping step comprises obtaining rules from a user profile.

17. The method as defined in claim 10, wherein the obtaining rules for warping step comprises selecting rules based on an available bandwidth designation.

18. A method for warping image data comprising:
   receiving the image data for an image;
   determining whether the image is a graphics heavy image or a text heavy image;
   obtaining a first set of warping rules in response to determining that the image is a graphics heavy image;
   obtaining a second set of warping rules in response to determining that the image is a text heavy image;
   segmenting the image into a plurality of regions based on regional classification of the image;
   classifying each region of the image into a data type of a plurality of data types, wherein each data type has a corresponding warping rule, and wherein multiple elements in a region are operable to be classified under a single data type;
   displaying the image on a display with different display charactetistics, wherein the different display characteristics are based upon the determination of whether the image is a graphics heavy image or a text heavy image, wherein each data type has a corresponding rule for warping within the obtained first or second set of warping rules, and the corresponding warping rules are the corresponding rules for warping for the data types that the regions are classified in; and
   warping the image based on the classification of each region and the corresponding warping rules.

19. The method as defined in claim 18, further comprising displaying the warped image.

20. The method as defined in claim 18, wherein the segmentation of the image into a plurality of regions based on regional classification of the image step includes correlating each region to a set of coordinates.

21. A program product comprising memory encoded with machine readable program code for causing a server to
   determine whether an image is a graphics heavy image or a text heavy image;

obtain a first set of warping rules in response to determining that the image is a graphics heavy image;
obtain a second set of warping rules in response to determining that the image is a text heavy image;
perform segmentation of the image into a plurality of regions based on regional classification of the image in response to a request by a client;
classify each region of the image into a data type of a plurality of data types, wherein each data type has a corresponding warping rule within the obtained first or second set of warping rules, and wherein multiple elements in a region are operable to be classified under a single data type;
warp the segmented image, wherein each data type of the segmented image is warped according to the corresponding warping rule; and
transmit the warped image data to the client, wherein the warped image data represents a modified version of the image.

22. The program product as defined in claim 21, wherein the code causes the server to receive a user interaction with a warped image, translate the interaction to the image.

23. The program product as defined in claim 22, wherein the code causes the server to pass the interaction in the image back to an originating application that originated the image.

24. The program product as defined in claim 21, wherein the segmentation of the image into a plumlity of regions based on regional classification of the image step comprises determining a classification for each of a plurality of regions in the image based on a data type for data in the region.

25. The program product as defined in claim 24, wherein the plurality of regions are indexed in a hierarchical data structure.

26. The program product as defined in claim 25, wherein the classifications include at least two of a bitmap, graphic, text word, and text line.

27. The program product as defined in claim 20, wherein the segmentation of the image into a plurality of regions based on regional classification of the image step includes correlating each region to a set of coordinates.

28. A program product for client-side processing of an image, the product comprising memory encoded with machine readable program code for causing a machine to
receive image data for a segmented image with classification of regions, wherein each region of the image is classified into a data type of a plurality of data types, and wherein multiple elements in a region are operable to be classified under a single data type;
obtain rules for warping the image so the image can be displayed with different display characteristics, wherein each data type contains corresponding rules for warping and the rules are obtained based on an available bandwidth; and
warp the image based on the classification of each region and the rules for warping corresponding to the data types that the regions are classified in.

29. The program product as defined in claim 28, wherein the code also causes the machine to receive user interaction with the warped image and translate the interaction to the image.

30. The program product as defined in claim 29, wherein the code also causes the machine to pass the interaction in the image back to an originating application that originated the image data.

31. The program product as defined in claim 28, wherein a warping rule obtained in said obtaining rules for warping step comprises applying an image scaling algorithm to all images to obtain scaled images.

32. The program product as defined in claim 31, wherein a warping rule obtained in said obtaining rules for warping step comprises moving at least one scaled image to a predetermined location in the warped image.

33. The program product as defined in claim 28, wherein the obtaining rules for warping step comprises obtaining a set of rules via selection by a user.

34. The program product as defined in claim 28, wherein the obtaining rules for warping step comprises obtaining rules from a user profile.

35. A program product comprising memory encoded with machine readable program code for causing a machine to
determine whether an image is a graphics heavy image or a text heavy image;
obtain a first set of warping rules in response to determining that the image is a graphics heavy image;
obtain a second set of warping rules in response to determining that the image is a text heavy image;
perform segmentation of the image into a plurality of regions based on regional classification of the image;
classify each region of the image into a data type of a plurality of data types, wherein each data type has a corresponding warping rule, and wherein multiple elements in a region are operable to be classified under a single data type;
display the image on a display with different display characteristics, wherein the different display characteristics are based upon the determination of whether the image is a graphics heavy image or a text heavy image; and
warp the image based on the classification of each segment and the corresponding warping rule corresponding to the data type within the obtained first or second set of warping rules.

36. The program product as defined in claim 35, wherein the segmentation of the image into a plurality of regions based on regional classification of the image step includes correlating each region to a set of coordinates.

37. The program product as defined in claim 35, further comprising code for: receiving a user interaction with a warped image; and translating the interaction to the image.

38. The program product as defined in claim 37, further comprising code for passing the interaction in the image back to an originating application that originated the image.

39. The program product as defined in claim 35, wherein the segmentation of the image into a plurality of regions based on regional classification of the image step comprises determining a classification for each of a plurality of regions in the image based on a data type for data in the region.

40. The program product as defined in claim 39, wherein the plurality of regions are indexed in a hierarchical data structure.

41. A system comprising:
a component for obtaining image data for an image;
a component for determining whether the image is a graphics heavy image or a text heavy image;
a component for obtaining a first set of warping rules in response to determining that the image is a graphics heavy image and for obtaining a second set of warping rules in response to determining that the image is a text heavy image;
a component for performing segmentation of the image into a plurality of regions based on regional classification of the image, wherein the segmentation includes classifying each region of the image into a data type of a plurality of data types, wherein each data type has a corresponding warping rule within the obtained first or second set or warping rules, and wherein multiple elements in a region are operable to be classified under a single data type, the segmentation performed in response to a request by another party;

a component for warping the segmented image using the corresponding warping rules for the data types that the regions are classified in; and a component for transmitting the warped image data.

42. The system as defined in claim 41, further comprising: a component for receiving a user interaction with a warped image; and a component for translating the interaction to the image.

43. The system as defined in claim 41, wherein the segmentation component determines a classification for each of a plurality of regions in the image based on a data type for data in the region.

44. The system as defined in claim 43, wherein the plurality of regions are indexed in a hierarchical data structure.

45. A client comprising a component for receiving image data for an image with classification of regions, wherein each region is further classified into a data type of a plurality of data types, wherein each data type has a corresponding warping rule, which are obtained based on the amount of bandwidth available to the client, and wherein multiple elements in a region are operable to be classified under a single data type; and a component for warping the image based on the classification of each region and the warping rules corresponding to the data types that the regions are classified in, so the warped image has display charaeleristies that are different than those of the image data.

46. The client as defined in claim 45, further comprising a component for displaying the warped image.

47. The client as defined in claim 45, further comprising: a component for receiving a user interaction with the warped image; and a component for translating the interaction to the image.

48. The client as defined in claim 45, wherein the obtaining rules component obtains a different set of rules based on whether the image is a web page or a text document.

49. The client as defined in claim 45, wherein the obtaining rules component obtains rules from a user profile.

50. A system for warping image data comprising means for receiving image data;

means for performing segmentation of the image into a plurality of regions based on regional classification of the image, wherein each region is further classified into a data type of a plurality of data types, wherein each data type has a corresponding warping rule, and wherein multiple elements in a region are operable to be classified under a single data type;

means for obtaining a set of warping rules for warping the image so the image can be displayed on a display with different display charaeleristies; and means for warping the image based on the classification of each region and the corresponding warping rules for the data types that the regions are classified in, wherein warping the image includes applying a scaling algorithm to the image to obtain at least one sealed region within the image and moving the at least one scale region to a predetermined location within the warped image.

* * * * *

UNITED STATES PATENT AND TRADEMARK OFFICE
CERTIFICATE OF CORRECTION

| | |
|---|---|
| PATENT NO. | : 7,278,117 B2 |
| APPLICATION NO. | : 10/186694 |
| DATED | : October 2, 2007 |
| INVENTOR(S) | : Ullas Gargi |

It is certified that error appears in the above-identified patent and that said Letters Patent is hereby corrected as shown below:

In column 9, line 11, in Claim 1, after "obtaining" insert -- a --.

In column 9, line 14, in Claim 1, delete "test" and insert -- text --, therefor.

In column 9, line 49, in Claim 8, delete "far" and insert -- for --, therefor.

In column 10, line 15, in Claim 13, delete "claim 10" and insert -- claim 8 --, therefor.

In column 10, line 19, in Claim 14, delete "claim 10" and insert -- claim 8 --, therefor.

In column 10, line 23, in Claim 15, delete "claim 10" and insert -- claim 8 --, therefor.

In column 10, line 26, in Claim 16, delete "claim 10" and insert -- claim 8 --, therefor.

In column 10, line 29, in Claim 17, delete "claim 10" and insert -- claim 8 --, therefor.

In column 10, line 48, in Claim 18, delete "charactetistics" and insert -- characteristics --, therefor.

In column 11, line 21, in Claim 22, after "code" insert -- also --.

In column 11, line 28, in Claim 24, delete "plumlity" and insert -- plurality --, therefor.

In column 11, line 38, in Claim 27, delete "claim 20" and insert -- claim 21 --, therefor.

In column 13, line 34, in Claim 45, delete "charaeleristies" and insert -- characteristics --, therefor.

In column 14, line 24, in Claim 50, delete "charaeleristies" and insert -- characteristics --, therefor.

In column 14, line 30, in Claim 50, delete "sealed" and insert -- scaled --, therefor.

UNITED STATES PATENT AND TRADEMARK OFFICE
CERTIFICATE OF CORRECTION

PATENT NO. : 7,278,117 B2
APPLICATION NO. : 10/186694
DATED : October 2, 2007
INVENTOR(S) : Ullas Gargi It is certified that error appears in the above-identified patent and that said Letters Patent is hereby corrected as shown below:

In column 14, line 31, in Claim 50, delete "scale" and insert -- scaled --, therefor.

Signed and Sealed this

Twenty-second Day of July, 2008

JON W. DUDAS
*Director of the United States Patent and Trademark Office*